United States Patent
Dieffenbach

[15] 3,665,577
[45] May 30, 1972

[54] APPARATUS FOR MANUFACTURING ARTIFICIAL SHRUBS

[72] Inventor: Percy Dieffenbach, Blakely, Pa.
[73] Assignee: Masterpiece, Inc., Blakely, Pa.
[22] Filed: Oct. 21, 1970
[21] Appl. No.: 82,676

[52] U.S. Cl. ................................29/208 D, 29/211 D
[51] Int. Cl. ........................................B23p 19/04, B23g 7/10
[58] Field of Search ............29/208 D, 208 R, 211 D, 208 C, 29/33 F, 34 D, 33 P, 33 Q

[56] References Cited

UNITED STATES PATENTS 3,504,423    4/1970    Kraszeski et al. ................29/208 D X Primary Examiner—Thomas H. Eager
Attorney—Sughrue, Rothwell, Mion, Zinn & Macpeak

[57] ABSTRACT

Laterally spaced endless conveyor chains carry slotted members on the individual links. Selected slots receive a varying number of shrub limbs of varying length which are in turn discharged into the nip between two stiffly flexible wires or they are removed from storage reels and intertwisted. A rotary chuck on a reciprocating carriage selectively grasps the ends of the wires and moves the same longitudinally in synchronism with the endless conveyor which discharges the limbs in between the wires. Rotating the chuck causes the wires to intertwist capturing the limbs at space locations defined by their position on the endless chain conveyors. After pulling and intertwisting the wires to a desired length up to 15 feet or more, the intertwisted wires are severed just behind the wire guide pulleys thereby producing a completely assembled shrub.

Narrow webs are simultaneously fed between the intertwisted wires and captured limbs to define the simulated trunk for the shrub. Actuators carried by the endless chain conveyors contact stationery microswitches to energize solenoids for respective gravity operated chutes controlling the feed of limbs which vary both in length and number into the slots.

10 Claims, 7 Drawing Figures

APPARATUS FOR MANUFACTURING ARTIFICIAL SHRUBS

BACKGROUND OF THE INVENTION

1. Field of the Invention

This invention relates to the manufacture of artificial shrubbery and more particularly to the manufacture of artificial trees which may be used for indoor or outdoor use which are extremely rugged and require little or no assembly.

2. Description of the prior Art

Artificial shrubs and in particular artificial trees have replaced to a large extent, either trees in cut form for use principally as Christmas decorations or in ball form for planting either indoors or outdoors. Trees employed in landscaping of commercial businesses such as islands in typical retail gasoline stations, due to traffic conditions and the spilling of oil, gasoline, etc., are subjected to continual abuse. Artificial trees which require no replacement, have great economical advantage since in the past, natural trees required replanting, sometimes on a yearly basis.

One type of artificial tree which has received excellent public response is the type shown in applicant's copending Patent application Ser. No. 3,414 filed 1/16/70 entitled "Artificial Shrubbery and Method of Manufacturing the Same." In that copending application, the artificial tree comprises a series of artificial limbs formed of twisted wire and filaments generally known as "brush stock" which quite closely simulates the needled branches or limbs of a natural coniferous tree. Such shrubs, preferably in tree form, are manufactured by placing the ends of two or more precut stiffly flexible wire stem members in longitudinal, parallel positions within a first chuck member with the opposite ends open. In such position, the stiffly flexible limb members are inserted between the parallel stem with groups of limb members being separated longitudinally by sliding flexible tube sections onto the stem members from the free ends towards the first chuck member. Thus in alternate fashion, the assembly is built up and the open ends of the stem members are then placed in a second chuck member. By rotating one chuck member with respect to the other, the wire stem members are intertwisted to securely lock the limbs at longitudinally spaced positions defined by the flexible tube sections which act as spacers.

Preferably, a complete tree is formed in this manner, although one tree section having multiple, longitudinally spaced limbs may be so formed and may be carried by an axial hole in the upper end of a rod-like trunk member with a further series of limb assemblies coupled in radially extending fashion to the rod-like trunk member by inserting one end in radially and upwardly inclined holes within the rod-like trunk member to complete the tree assembly. Alternatively a complete tree may be formed by spacing a plurality of short tubular members circumferentially about and fixed to the trunk member with their axis parallel thereto and employing preformed limb assemblies as identified above with its top end reversely bent to form a hook and with the crosslimbs preferably separated by tubular spacers extending radially outward of the main limb and to one side only to define a frusto-conical shrub or tree sector. The hooked end of each limb assembly is then inserted within the open top of the short tubular member to provide a full circumferential array of the frusto-conical sectors to form the major base portion of the otherwise conical tree. The tree is completed by inserting a tree top into an axial hole in the upper end of the trunk member.

SUMMARY OF THE INVENTION

While this method of manufacture of an artificial shrub and in particular an artificial tree constitutes a major advancement in the art, the production of a complete tree is limited in two respects. First, the manufacture or production is semi-automatic in that the stiffly flexible wire rods are precut to the approximate length of the tree. Secondly, the ends of one pair are placed in the first chuck, the opposite ends separated to allow insertion of limb, the open ends forced together to allow a tube section to be slid onto the open ends of the same, the wire rods again spread to allow insertion of the next limb or limbs and by a sequence of such operations the assembly is completed prior to clamping the open ends in a second chuck and rotating the same to effect intertwisting of the flexible wire rods to define the trunk and to capture the limbs at spaced locations. One of the major problems in attempting to fully automate the manufacturing process is the fact that the limbs vary in length, that is, there are shorter limbs at the top of the tree and longer limbs at the bottom much in the same manner as a natural tree which produces the overall conical taper so characteristic of natural coniferous trees used for Christmas decorations.

The present invention is directed to an apparatus for the continuous, automatic production of artificial shrubs and comprises a pair of endless conveyors mounted for horizontal movement, preferably in the form of endless chains whose links carry means defining outwardly directed radial slots. As the endless conveyor moves along its top run, the means defining the slots underly the discharge ends of a number of gravity operated chutes with solenoid operated stops allowing a varying number of limbs to be discharged from the ends of the chute and into the underlying slot. Thus the limbs lie across and extend beyond the laterally spaced endless chains. At the discharge end of the endless conveyor chains, when the slot means of the links move to a downwardly inclined position, as they pass about the supporting sprocket wheels, the limbs are discharged radially outwards from the slots and move in between a pair of stiffly flexible wires which are each wrapped partially about the periphery of respective vertically spaced guide pulleys, such that the limbs enter the nip of the two endless wires and are captured therebetween.

On the opposite side of the guide pulleys is positioned a reciprocating carriage which supports a rotatable chuck whose jaws may be opened and closed as desired. The chuck moves toward the wires to grasp the same and when moving away from the endless conveyor chains, is rotated to intertwist the wires and to thereby capture the limbs at spaced locations. The endless chain moves in synchronism with the carriage to insure proper positioning of the limbs at predetermined longitudinally spaced locations between the intertwisted wire rods. At the end of the carriage movement away from the endless conveyor chains, a cutter severs the intertwisted wires, with the limbs being captured between the intertwisted wires and extending radially of the same to define a completed tree or shrub. The chuck jaws open discharging the completed tree and the carriage is again returned to its position adjacent the wire guide pulleys for regrasping the severed ends of the intertwisted wires by closing of the chuck jaws. Preferably, narrow web material is fed between the intertwisted wires to both insulate the wire rods from the limbs and to effect, due to the spiral wrapping of the web, the simulation of a trunk as its fans radiate from the intertwisted wires. Endless drive means mechanically coupled to the carriage is geared directly to the endless conveyor means to insure synchronism of movement of the endless chain delivering the limbs in proper sequence to the stiffly flexible wires and the carriage.

BRIEF DESCRIPTION OF THE DRAWINGS

FIG. 3 is a side elevational view of the portion of the apparatus shown in FIG. 1.

FIG. 4 is an enlarged side elevational view of a portion of one of the conveyor chains illustrating the slot defining members associated with the individual chain links.

FIG. 5 is a front elevational view of the portion of the chain shown in FIG. 3.

Figure 1:
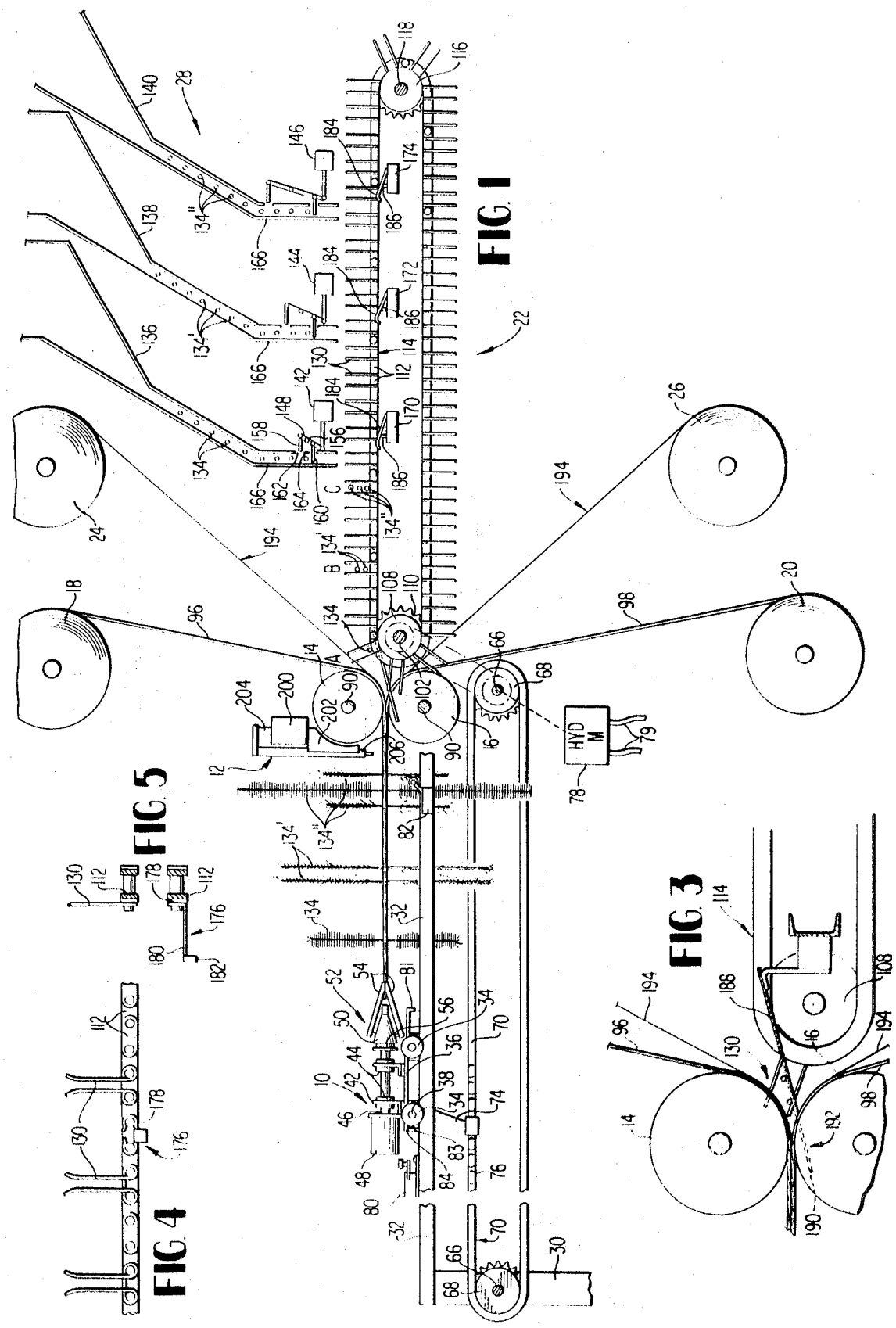
FIG. 1 is a schematic elevational view of the automated apparatus of the present invention.

The elements forming the apparatus of the present invention are illustrated schematically with the means support the elements in relation to other element generally not shown. However, with respect to the reciprocating carriage 10 there is provided a frame including vertical support member 30 which acts to support a pair of laterally spaced support rails or tracks 32 for the individual wheels 34 of reciprocating carriage 10. The tracks 32 extend horizontally to support the carriage 10. The carriage 10 further comprises a flat base plate 36 upon which are mounted the wheels 34 for rotation about their axis defined by axles 38. In this respect, the wheels 34 carry peripheral grooves 40 to receive the upstanding edge of the L-shape track 32. Thus, the carriage 10 reciprocates horizontally along the longitudinal tracks of the apparatus. Upstanding brackets 42 carry bearings 44 which in turn receive a rotatable shaft 46 which is driven by a hydraulic or air motor 48 fixedly mounted on carriage 10. Coupled to the outer end of the shaft 46 is an axially shiftable frusto-conical member 50 forming a portion of a rotatable chuck 52. The frusto-conical member 50 is freely slidable on a shaft 46 while, a pair of chuck jaws 54 are pivotably mounted on the shaft, and generally rotate therewith. Jaws 54 open and close by sliding the frusto-conical member 50 axially on shaft 46. In order to accomplish this, a peripheral groove 56 is provided on the frusto-conical member 50 to receive the opposed ends of a yoke 58, the yoke being coupled to the base plate 36 for pivoting about a vertical axis as defined by support pin 60, FIG. 2. A reciprocating hydraulic motor 62 has its shaft 64 pin connected to the outer end of yoke 58 such that, by energizing the hydraulic motor 62, the yoke may be rotated about mounting pin 60 to cause appropriate oscillation of the frusto-conical member 50 and opening and closing of the chuck jaws 54. Both the reciprocating carriage and the rotatable chuck carried by the same is standard in construction and is similar to that employed in my earlier patent, U.S. Pat. No. 3,223,454 in the manufacture of the limbs defining in conjunction with the twisted wire rod, the principal components of the artificial trees or shrubs manufactured by the apparatus of the present invention. The construction of the carriage and its operation is described in greater detail, in the referred-to patent and reference may be had thereto. However, instead of using a reciprocating fluid motor to effect carriage movement along rails 32, the present invention employs an endless drive means to this end. Beneath the laterally spaced rails 32 and adjacent the ends of the same, are mounted for rotation, rotatable shafts 66. On each side of the machine, the shafts carry rotatable sprocket wheels 68. In turn, the sprocket wheels 68 carry endless chains 70. Extending outwardly from the base plate 36 of the reciprocating carriage, and fixed thereto, are axle supporting members 72, from which the carriage wheel axles 38 extend. Fixed to the axle supports 72, and depending therefrom are chain coupling members 74 which are coupled to one of the links 76 of each endless chain 70. The chains are driven by a suitable hydraulic motor 78, preferably coupled directly to one of the sprocket support shafts 66. Spaced along the reciprocating path of carriage 10, and adjustably positioned along rails 32, are microswitches 80 and 82. Abutment means 81 and 84, carried by the carriage 10, make contact with respective microswitches 80 and 82 to reverse the supply of hydraulic fluid to hydraulic motor 78 and at the same time selectively supply hydraulic fluid to hydraulic motor 48 or cutoff the same via lines 49, to cause selective rotation of drive shaft 46 and thus chuck 52. Also, hydraulic fluid is selectively provided to hydraulic reciprocating motor 62 via lines 63 to open the chuck jaws at the end of carriage movement in a pulling direction that is from right to left, FIG. 1, and close the jaws automatically upon return of the carriage from left to full right position in the same Figure. At the inboard end of rails 32, there are provided, the wire guide pulleys 14 and 16 which are mounted for free rotation about their axis by mounting shafts 90, the shafts extending laterally between vertical support members 92. The wire guide pulleys carry peripheral grooves 94. Stiffly flexible wires are fed from respective supply reels 18 and 20 and engage the peripheral grooves 94 of the upper and lower wire guide pulleys 14 and 16. Upper wire 96 and the lower wire 98 are fed into the nip area between the vertically spaced guide pulleys 14 and 16 at some angle, preferably in excess of 45° to the horizontal. Thus, after the carriage 10 reciprocates from left to right, FIG. 1, the open jaws move under the action of inboard microswitch 82 to close upon the ends of the wire rods 96 and 98. Further, when the carriage reciprocates from right to left the wires 96 and 98 are pulled under some frictional restraint from the supply reels 18 and 20 and, under the action of rotary hydraulic motor 48, rotation of the chuck 52 causes the stiffly flexible wires to be intertwisted during the reciprocating movement from right to left.

The present invention is particularly directed to the automatic feeding of limbs of predetermined, varying length and in predetermined but varying number between the wire rods 96 and 98 at closely controlled longitudinal positions. In that respect, just behind the vertically spaced wire pulleys 14 and 16, support members including horizontal frame member 100 supports for its rotation about its axis, shaft 102 on bearings 104, the rotating shaft extending horizontally, and parallel to conveyor drive shaft 66 but slightly above and inboard of the same. In this respect, the paired bearings 104 provided on each side of the wire guide pulleys 14 and 16 are fixedly located by vertical support means (not shown). Fixed to rotating shaft 102, are sprocket wheels 108, whose teeth 110 engage the links 112 of endless chains 114 defining the endless limb feed conveyor 22. The endless conveyor chains 114 are carried at the opposite end by similar sprocket wheels 116 which are fixed to shaft 118, the shaft 118 rotating about its axis and being supported by bearings 120 mounted on fixed vertical supports (not shown). The shaft 102 has further fixed thereto, a sprocket wheel 120 and carries a drive chain 122 which engages a sprocket wheel 126 fixed to the shaft 66 carrying the hydraulic drive motor 78. A one way clutch mechanism 128 is incorporated in the drive system for the endless conveyor 22 preferably as an intregal component of the driven sprocket wheel 120. As illustrated in FIG. 5, the one way clutch is indicated at 128 as being operatively coupled to upper sprocket wheel 120.

The endless limb feed conveyor 22 is characterized by having coupled to individual links of 112 of each chain, slot defining members or clips 130, FIGS. 4 and 5, in this case being formed of bent wire and being attached to the link by receiving the projecting portions of the pins 132 which couple the links 112 together. The bent wire slot defining means or wire clips 130 are illustrative only of one form of limb receiving slots which can be carried by the endless conveyor 22. The function of the slotted members 130 is to carry individual limbs 134, 134', 134'', etc. from the various storage bins such as 136, 138, and 140 in overlying positions to the endless conveyor chain. As evidenced in FIG. 1, only selective slots as at A, carry a limb 134 toward the discharge end of the conveyor 22 adjacent the wire guide pulleys 14 and 16. In this respect, the bin 136 carries limbs 134 of relatively short length, bin 138 carries limbs 134' of intermediate length and bin 140 carries limbs 134'' of slightly greater length. Further, means associated with each bin may selectively discharge either one limb, two limbs, three limbs or as many as desired to insure the completion of a finished tree or shrub product having the desired bushiness depending on the number of limbs at any given position and having a tapered appearance depending upon the length of the same. In this respect, associated with bin 136 is a solenoid 142, while solenoids 144, 146 are associated with bins 138 and 140 respectively. A lever 148 is pivotably coupled at one end to each solenoid piston 152 via pin connection 154 while a lever 148 is pivoted intermediate of its ends on a fixed pivot pin 156. Extending from the pivoted lever 148 is a pair of alternately operated stops 158 and 160 which selectively and alternatively project through slots 162 and 164 respectively within each narrow chute 166 for the various bins. Depending upon the length of the levers 148 and position of the slots 162 and 164, a greater or lesser number of limbs are gravity fed from their respective bins through the narrow chutes to fall into the slots of the endless conveyor chains 114. For instance, as seen in FIG. 1, one short limb 134 fills slot A, two limbs 134' fill slot B and three limbs of a slightly greater length 134" fill slot B as defined by members 130 on each chain.

Figure 2:
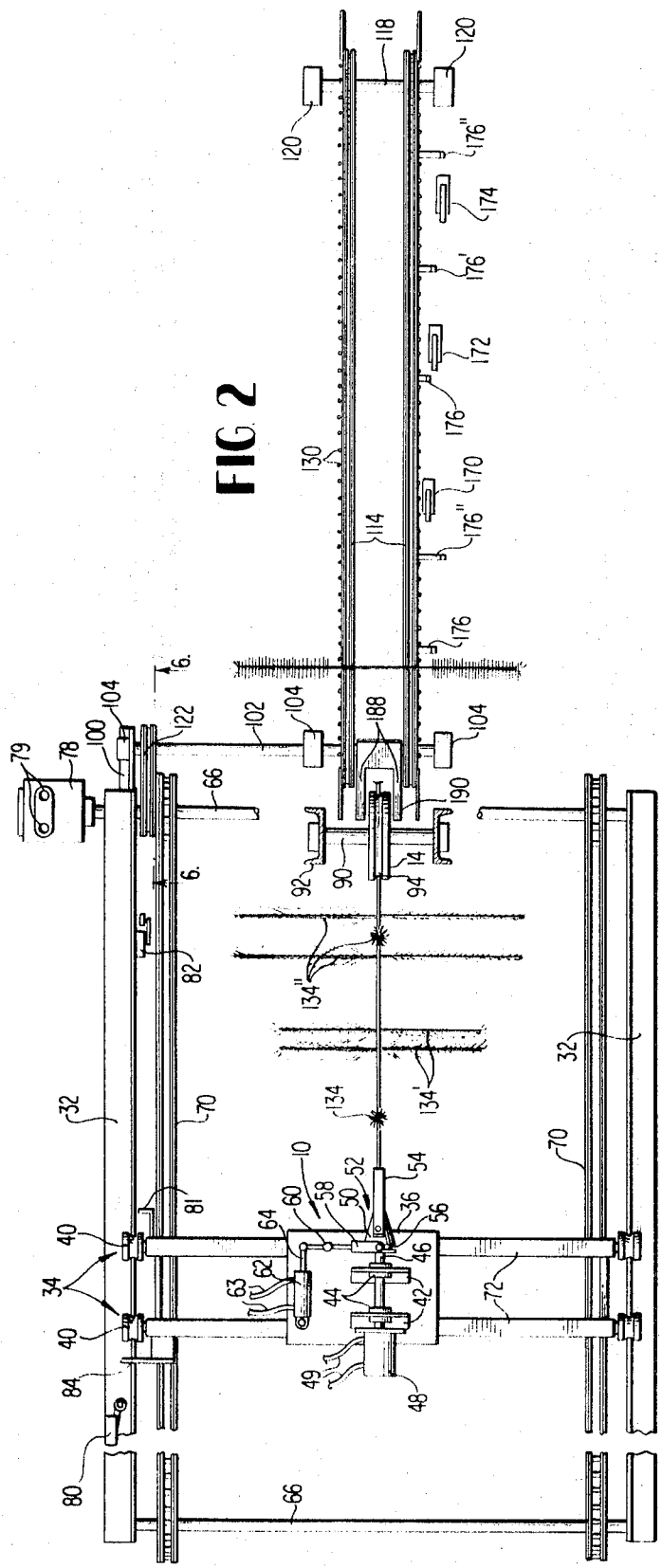
FIG. 2 is a top plan view of the apparatus shown in FIG. 1.
Figure 6:
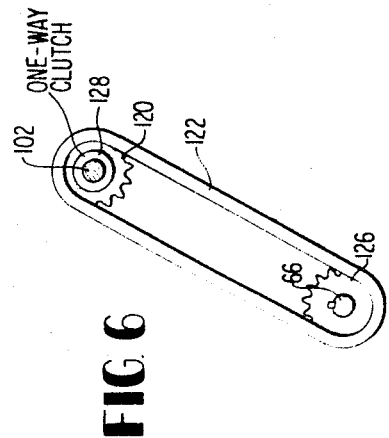
FIG. 6 is an enlarged elevational view of a drive mechanism coupling both the endless conveyor chains and the endless drive means for the carriage to a single drive motor.

While the selected limb retaining slots within the endless chains are filled with a varying number of limbs of different or similar lengths under different modes of automated operation, there is illustrated one arrangement for achieving the same. A plurality of microswitches 170, 172 and 174, for instance, are positioned along the path of one of the moving conveyor chains 114 and just to the side thereof. In turn, in addition to the wire slot defining means 130, each selected chain 114 has coupled thereto microswitch actuator abutments 176, 176' and 176" consisting of a wire clip segment 178 and an L-shaped actuator segments 180. The L-shaped actuator segments 180 may be of different length and the positioning of the microswitches 170, 172 and 174 may be set as illustrated in FIG. 2. During movement of the conveyor chain 114, the depending abutment portion 182 of the L-shaped actuator segment 180 will depress the spring biased microswitch follower 184 which in turn presses against microswitch button or pin 186. Thus, in FIG. 2, chain carrying abutments 176 will actuate only microswitch 170, abutments 176' will actuate only microswitch 172 and abutments 176" only microswitch 174. In the illustrated embodiment, a completed tree or shrub having a length of approximately 5 feet is produced by the automatic deposit of short limbs 134, medium length limbs 134' and long limbs 134" into appropriate slots in the order identified at A, B and C. This is determined by the actuation of microswitches 170, 172 and 174, in turn, by the abutments 176, 176' and 176" as the conveyor moves in a counter clockwise direction, FIG. 1, such that the top run of the same passes from left to right.

Not only are the limbs gravity fed from respective bins 136, 138 and 140 into the slot defining means 130 on the spaced parallel chains 114, but when the chain links pass over and about sprocket wheels 108 straddling the wire guide pulleys 14 and 16, the limb move by gravity from the slot defining means 130 and into the nip area of the upper and lower wires 96 and 98 as they pass about the periphery of their respective wire guide pulleys 14 and 16. This is best seen by reference to FIG. 3 wherein a single pair of wire slot defining means 130 are shown at nearly horizontal position in moving about sprocket wheel 108. On each side of endless chains 114 are provided downwardly inclined guide plate segments 188 whose free ends 190 lie below the gap existing between the upper and lower guide pulleys 14 and 16 and the nip area 192 of the approaching wires 96 and 98. The other end of the guide plate is fixed to support means 194 which extends laterally between the endless conveyor chain, and rearwardly of the sprocket wheels 108.

It is further important to note that the present invention provides means for giving some illusion of substance to the tree or shrub trunk in addition to that provided by the intertwisting of the stiffly flexible wires 98 and 96. In this respect, one or more webs 194 of plastic material of several inches in width are automatically unreeled from web supply reels 24 and 26 which are mounted for rotation above and below the endless conveyor chains and rearwardly of the wire supply spools 18 and 20. The webs are moved into the nip area 192 of the wire, contacting the periphery of the wire guide pulleys 14 and 16 and are intertwisted with the same by rotation of the chuck 52 carried on the reciprocating carriage 10. Thus, movement of the carriage from right to left, FIG. 1, causes the web material 194 to be fed from respective spools 24 and 26 under frictional restraint and captured between the intertwisted wires 96 and 98. It is noted that the carriage 10 can move only between limits as defined by the inboard and outboard microswitches 82 and 80, respectively, the length in the illustrated embodiment on the order of 5 feet for a 5 foot tree. In the illustrated embodiment, after the carriage has moved from right to left, FIG. 1, a distance of 5 feet as determined by the microswitches and while, during movement chuck 52 has been rotated to achieve the intertwisting of the upper and lower wires 96 and 98 with the synchronous movement of the endless conveyor 22 causing the feeding of various sets of limbs at longitudinally spaced positions defined by or in proportion to the selected slots on the endless conveyor chain 114, the completed assembly is severed by means of cutter 12. In this respect, the cutter comprises an arrangement identical to my Patent U.S. Pat. No. 3,223,454 in that a hydraulic reciprocating motor 200, fixed to a vertical support member 202, causes during extension and retraction of piston 204, a like extension and operation of cooperating cutter blades 206. The cutter and its method of operation are quite conventional and it is suffice to state the movement of the cutter blades 206 together during travel towards the intertwisted wires, effects severence of the intertwisted wires 96 and 98 to the left hand side, FIG. 1, of the guide pulleys 14 and 16. Thereupon, the chuck 52 simultaneously opens and the completed assembly drops by gravity to fall upon an endless delivery conveyor (not shown) or within a bin or the like as desired. It is noted in this respect, that the spaced rails 32 and the endless drive chains 70 are spaced laterally a distance greater than the length of any of the limbs 134, 134' or 134" thus insuring as the carriage 10 moves outwardly and the chuck 52 rotates, that the limbs are free to rotate as the wires 96 and 98 are intertwisted. The wires may be twisted to a slight degree, that is just sufficient turns, to cause the limbs to be captured at spaced longitudinal positions depending upon the speed of the feed conveyor 22 as the carriage moves from right to left, FIG. 1, and thereafter when the carriage 10 reaches its furthermost point from the wire guide pulleys 14 and 16 as defined by microswitch 80, and the carriage is stopped momentarily, the chuck 52 may be rotated at high speed to complete the intertwisting of the wires 96 and 98. Alternatively the wires may be fully intertwisted during carriage movement by rotating chuck 52 at high speed.

The manufacturing apparatus of the present invention employs a minimum number of automatic control elements which cooperate with fluid controlled motors to effect fully automatic operation of the same. In this respect, the carriage 10, and the endless conveyors 22 is driven in synchronism through the single hydraulic motor 78 to which hydraulic fluid is delivered for both forward and reverse operation via lines 79 under the control of microswitches 80 and 82. Hydraulic fluid is applied to motor 78 in a direction to cause the endless drive chain 70 to move carriage 10 from the extreme left hand position as defined by microswitch 80, FIG. 1, to the extreme right hand position as defined by microswitch 82. During this movement, there is no hydraulic fluid supplied to hydraulic motor 48 which acts to rotate chuck 52, and microswitch 80 further acts to open the chuck jaws 54 during movement from left to right by suitably actuating the reciprocating hydraulic motor 62. Further, during movement of the carriage from left to right, FIG. 1, the one way clutch 128 disconnects the driven shaft 102 from the driving shaft 66 and the endless chains 114 do not rotate during this portion of the cycle. When abutment 81 contacts the actuator of microswitch 82 the movement of carriage from left to right ceases. Microswitch 82 also acts on hydraulic motor 62 of carriage 10 to close the chuck jaws 54 and to grasp the severed end of the intertwisted wires 96 and 98 just to the left hand side of wire guide pulleys 14 and 16.

The carriage now reverses its direction of movement and the one way clutch 128 now couples driving shaft 66 with driven shaft 102 and causes rotation of the endless drive chains 114 in a counterclockwise direction, FIG. 1. Groups of limbs such as 134, 134' and 134'' at slot locations A, B and C to move in between wires 96 and 98 with the wires being intertwisted by rotation of chuck 52 as carriage moves from right to left that is away from microswitch 82 and towards microswitch 80. Movement of the carriage 10 is synchronized with movement of the endless conveyor 22 thus causing the limbs in single or group form to be deposited at spaced longitudinal positions which are either identical with the position of the selected slots A, B and C in that order, or at longitudinal positions within respective wires 96 and 98 in proportion thereto.

Preferably, as the carriage 10 returns from its left hand position to its right hand position to grasp the severed ends of wires 96 and 98, just to the left of the guide pulleys 14 and 16, the endless conveyor 22 remains motionless. As the chains 114 move, moving abutments 176, 176' and 176'' contact the followers of respective microswitch 170, 172 and 174 to automatically discharge controlled numbers of limbs into underlying slots during movement of the same. Selection of course is automatic with actuation of solenoids 142, 144 and 146 controlling the gravity discharge of limb operating in response to energization of the microswitches. Operation of each solenoid 142, 144 and 146 causes movement of lower stop outwardly of its slot, while the upper stop moves into its sidewall slot to prevent discharge of more than a predetermined number of limbs into the conveyor slots; one limb 134, two limbs 134' or three limbs 134'' as illustrated in the embodiment of FIG. 1.

Alternatively, instead of depositing limbs during movement of the endless feed conveyor 22 the discharge ends of the chutes 166 may be so positioned as to overly predetermined spaced slots. Although each spacing remains fixed in this case, it is only necessary to simultaneously energize the solenoids 142, 144 and 146 to discharge selected numbers of limbs of selected lengths into the slots underlying the discharge ends of the chutes. In this way filling of the slots occurs during stoppage of the endless conveyor 22. The disadvantage to this however, is the fact that the spacing between groups of limbs may not be changed since obviously the ends of the chutes 166 remained fixed relative to the underlying conveyor. In the illustrated embodiment the abutments are merely repositioned closer together or further apart on the endless chains 114 to control the number and spacing of limbs in the finished product. The discharge of the limbs from the chutes are controlled purely by the number of times the given solenoids 142, 144 and 146 are energized which is dependent upon the spacing and number of abutments 176, 176' and 176'' which are spring clamped onto the ends of the pins 132 which couple the chain links together. As evidenced in FIG. 2 the three microswitches 170, 172 and 174 are actuated by three different size abutments 176, 176' and 176'' and a single short limb is first deposited in a selected slot A, a second group of two limbs 134' are deposited in slot B and three limbs 134'' are deposited in slot C. This sequence may be repeated during the travel of the carriage a full 15 feet and a completed assembly of three short trees or shrubs will be formed prior to severence of the wires 96 and 98 by cutter blades 206. Thus in this case subsequent to the automated manufacture of a completed assembly of 15 feet, severence of the assembly is completed elsewhere than on the machine at spaced locations between the ends of the C group of limbs and the next succeeding single limb A to form three separate trees or shrubs. Where microswitch spacing for microswitches 80 and 82 are short, as for instance, where switch 80 is positioned in FIG. 1 immediately in the path of carriage abutment 83 further movement of the carriage from right to left ceases at that point whereupon actuation under control of microswitch 80 of the cutter blades 206 causes severence of the completed assembly. This point it is noted, is just prior to the single limb 134 in slot A moving down the inclined fingers of guide plate 188 and between the wires 96 and 98.

Further, while only three bins 136, 138 and 140 have been illustrated, it is obvious that a larger number of bins may be employed one for each possible limb location along a given length of intertwisted wire 96 and 98 as determined by the length of rails 32 or alternatively if only three lengths of limbs are employed in the manufacture of a tree say for instance of 15 feet in height, for a full cycle of counterclockwise rotation of the endless feet conveyor 22 a lesser number of bins may have limbs discharged at multiple locations along the moving conveyor for a plurality of slots for each cycle of operation. This sequence may be automatically initiated through microswitches including those at 170, 172 and 174 or by other control means either responsive directly to the movement of the conveyor or under automated control via a punched tape or other preformed format. Further, while the endless feed conveyor is synchronized with movement of the carriage through a common hydraulic motor with a one way clutch, independent but synchronized drive means may be employed for feed conveyor 22 and the drive chains 70 for the carriage 10. It is important also to note that while the function of the webs 194 is to simulate a trunk due to its spiral wrapping to a thickness much greater than that of the combined intertwisted wires 96 and 98, the webs perform an additional function since they insulate electrically the limbs from the twisted wire trunk defining wires 96 and 98. This is especially important where, the limbs are the type in the referred-to patent, U.S. Pat. No. 3,223,454 in which the limbs themselves comprise intertwisted wires capturing plastic filaments at spaced location to simulate an artificial coniferous tree.

Figure 7:
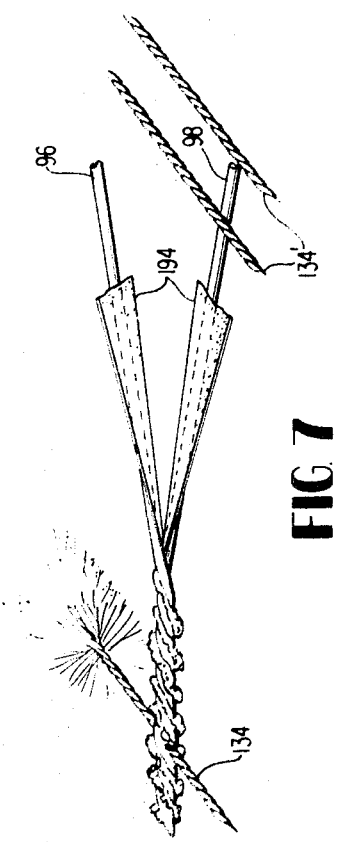
FIG. 7 is a perspective view illustrating the formation of the shrub product by intertwisting the wires. Description of the Preferred Embodiment Referring to the drawings, the apparatus of the present invention for automatically completing the assembly of an artificial shrub or tree, in heights of 15 feet or more, consists principally of a reciprocating carriage 10, a selectively energized cutter 12, wire guide pulleys 14 and 16, wire supply spools or reels 18 and 20, an endless limb feed conveyor 22, web supply reels 24 and 26 and selectively operated tree limb dispensing means 28, as illustrated in FIG. 1.

The completed product is partially illustrated in FIG. 7 as is the method of accomplishing the same.

While the invention has been described in conjunction with automated apparatus for filling selected slots on the endless feed conveyor, it is readily apparent that the individual slot defining means such as the formed wire clips 130 may be color coded either in terms of the length of the limbs to be placed therein and/or the number of limbs for a given slot, and the limbs placed therein either during movement of the conveyor or when the feed conveyor 22 is stopped and while the carriage 10 reciprocates from left to right to cause the chuck to engage the severed ends of the twisted wires 96 and 98.

While there have been shown and described and pointed out the fundamental novel features of the invention as applied to a preferred embodiment, it will be understood that various omissions and substitutions and changes in the form and detail of the apparatus illustrated and its operation may be made by those skilled in the art without departing from the spirit of the invention. It is the intention, therefore, to be limited only as indicated by the scope of the following claims.

What is claimed is:

1. An apparatus for automatically and continuously producing artificial shrubs, comprising:
   endless feed conveyor means for carrying at selected locations a variable number of branches extending generally at right angles to the direction of conveyor movement,
   a pair of stiffly flexible wire guide pulleys disposed at the discharge end of said conveyor means with the nip area generally in line therewith,
   means for feeding at least two stiffly flexible, wires over and between said guide pulleys,
   means for introducing said branches between said stiffly flexible wires as they leave said conveyor means,
   means for intertwisting said wires to capture said limbs between said wires at spaced locations corresponding to the spacing of said limbs on said endless feed conveyor means,
   means for synchronizing movement of said intertwisted wires and said endless feed conveyor means, and
   means for cutting said intertwisted wires into predetermined lengths to define a completed shrub assembly.

2. The apparatus as claimed in claim 1 further comprising:
   means for feeding at least one narrow web in-between said flexible wires prior to intertwisting the same to simulate an artificial shrub trunk and to electrically insulate the limbs from said intertwisted wires.

3. The apparatus as claimed in claim 1 wherein said conveyor means comprises laterally spaced endless conveyors including means defining outwardly extending slots for supporting a variable number of limbs at said longitudinally spaced positions for movement between said stiffly flexible wires prior to intertwisting of the same.

4. The apparatus as claimed in claim 3 wherein said endless conveyors comprises a pair of laterally spaced endless chains positioned for movement along paths on each side of said wire guide pulleys and said slots comprise U-shaped spring wire clips coupled to the links of said chains.

5. The apparatus as claimed in claim 1 further comprising a plurality of bins positioned above the upper run of said moving endless conveyors, narrow chutes leading from said bins and having their discharge end lying immediately above the conveyor slots, and means for selectively controlling the discharge of limbs from each of said chutes into respective slots.

6. The apparatus as claimed in claim 2 further comprising a plurality of bins positioned above the upper run of said moving endless conveyors, narrow chutes leading from said bins and having their discharge end lying immediately above the conveyor slots, and means for selectively controlling the discharge of limbs from each of said chutes into respective slots.

7. The apparatus as claimed in claim 3 further comprising a plurality of bins positioned above the upper run of said moving endless conveyors, narrow chutes leading from said bins and having their discharge end lying immediately above the conveyor slots, and means for selectively controlling the discharge of limbs from each of said chutes into respective slots.

8. The apparatus as claimed in claim 4 further comprising a plurality of bins positioned above the upper run of said moving endless conveyors, narrow chutes leading from said bins and having their discharge end lying immediately above the conveyor slots, and means for selectively controlling the discharge of limbs from each of said chutes into respective slots.

9. The apparatus as claimed in claim 5 wherein said means for controlling discharge of limbs comprises:
spaced, paired slidable stops alternatively intersecting the path of movement of the limbs through said chutes, and
solenoid means for effective removal of one stop from said chute and introduction of another therein to control the number of limbs discharged into an aligned slot underlying the discharge end of the same.

10. The apparatus as claimed in claim 9 wherein said control means further comprises:
abutments carried by at least one of said chains at spaced longitudinal positions and microswitches corresponding to said bins and operatively coupled to the bin control solenoids and mounted in the path of said abutments and selectively operable by the same to control respective solenoids for said limb supplying bins.

* * * * *